(12) United States Patent
Kerdraon et al.

(10) Patent No.: US 8,001,234 B2
(45) Date of Patent: Aug. 16, 2011

(54) METHOD AND SERVER FOR COORDINATION OF TELECOMMUNICATION SERVICES

(75) Inventors: Alan Kerdraon, Caen (FR); Emmanuel Bury, Pont l'Eveque (FR); Jacques Olivier Rebillon, Caen (FR)

(73) Assignee: France Telecom, Paris (FR)

( * ) Notice: Subject to any disclaimer, the term of this patent is extended or adjusted under 35 U.S.C. 154(b) by 148 days.

(21) Appl. No.: 10/582,129

(22) PCT Filed: Nov. 23, 2004

(86) PCT No.: PCT/FR2004/002990
§ 371 (c)(1),
(2), (4) Date: Oct. 24, 2006

(87) PCT Pub. No.: WO2005/067322
PCT Pub. Date: Jul. 21, 2005

(65) Prior Publication Data
US 2007/0118629 A1    May 24, 2007

(30) Foreign Application Priority Data
Dec. 11, 2003  (FR) .................................. 03 14524

(51) Int. Cl.
*G06F 15/16* (2006.01)
(52) U.S. Cl. ....................................................... 709/224
(58) Field of Classification Search .................. 709/206, 709/207, 223, 224; 455/466; 379/67.1, 88.03, 379/201.01, 201.02, 209.01, 210.01
See application file for complete search history.

(56) References Cited

U.S. PATENT DOCUMENTS

| | | | |
|---|---|---|---|
| 6,625,141 B1 | 9/2003 | Gourraud et al. | |
| 7,516,210 B2* | 4/2009 | Liscano et al. | 709/224 |
| 2002/0085701 A1* | 7/2002 | Parsons et al. | 379/211.01 |
| 2002/0196741 A1 | 12/2002 | Jaramillo et al. | |
| 2003/0009530 A1* | 1/2003 | Philonenko et al. | 709/206 |
| 2004/0064514 A1* | 4/2004 | Daniell et al. | 709/206 |
| 2005/0071428 A1* | 3/2005 | Khakoo et al. | 709/204 |

FOREIGN PATENT DOCUMENTS

| | | |
|---|---|---|
| FR | 2 814 021 | 3/2003 |
| FR | 2 834 164 | 6/2003 |

OTHER PUBLICATIONS

Day, Rosenberg and Sugano. RFC 2778, "A Model for Presence and Instant Messaging". Feb. 2000.*

* cited by examiner

*Primary Examiner* — William C Vaughn, Jr.
*Assistant Examiner* — Scott Christensen
(74) *Attorney, Agent, or Firm* — Patterson Thuente Christensen Pedersen, P.A.

(57) ABSTRACT

The invention is intended to co-ordinate telecommunication services (2) provided to users by means of terminals (3, 4, 5) which are connected to different telecommunication networks (1). For said purpose, the invention comprises the following steps: a service mediation server (10) co-ordinates different telecommunication services activated by users; the terminals (3, 4, 5) connect to the server and transmit users profiles thereto, said profiles specifying availability modes, activate the profiles and availability modes and access the connected services; and the service mediation server determines a reachability state for each user, which is dependent on at least one user terminal being connected to the server and the active availability mode and profile of the user, and transmits said state to the connected user terminals specified in a list of contacts in the active profile of the user.

21 Claims, 2 Drawing Sheets

METHOD AND SERVER FOR COORDINATION OF TELECOMMUNICATION SERVICES

RELATED APPLICATION

This application claims priority to PCT Application No. PCT/FR2004/002990 filed Nov. 23, 2004, and French Patent Application No. 03/14524 filed Dec. 11, 2003.

TECHNICAL FIELD

This invention relates to a method and a server for coordination of telecommunications services.

It applies in particular, but not exclusively, to telecommunications services accessible via a computer or telephone terminal connected to a telecommunications network, such as a telephone network or a computer network, for example the Internet.

BACKGROUND OF THE INVENTION

Examples of services provided by a telecommunications network include an intelligent telephone directory, indicating the accessible contacts, an automatic call referral service, an automatic correspondent call-back service, a messaging service, or a special events notification service, such as the publication of specific information on the Internet.

However, users of such services increasingly have a plurality of terminals (stationary personal and office telephone, mobile telephone, computer connected to the Internet, etc.). Therefore, there has appeared the need to make these services, independently of the terminals, available to users, presenting problems of access to the services and coherency when a single user uses different terminals to access a single service, and management of billing and access rights, when the user accesses a service by means of another service or from different terminals.

Patent application FR 2 814 021, filed by the applicant, describes a service coordination server making it possible to coordinate various telecommunications services, which may be provided simultaneously by different operators. This server is designed to receive and process requests transmitted by the services to identify and/or authenticate a user, when the latter accesses the service, to locate a user searched by a service, to obtain personalisation or authorisation information relating to a user, or to assess services billed by time, volume or on a fee-for-service basis.

However, for a user to be able to benefit from such telecommunications services, it is necessary for the user to be accessible by a telecommunications network. However, the service coordination server described in the aforementioned patent application does not have any capability for determining the state of accessibility of the users. In addition, this concept of accessibility must be distinguished from the concept of availability. Indeed, a user can be accessible, i.e. have a terminal that is accessible by a telecommunications network, but not want to be disturbed during a certain period. This service coordination server does not enable the availability of users to be managed either.

SUMMARY OF THE INVENTION

This invention is intended to overcome these disadvantages by proposing a heavy-duty, fault-tolerant reusable component that can be integrated at a lower cost when new services are provided. This objective is achieved by providing a method for coordinating telecommunications services provided to a plurality of users, by means of telecommunications terminals connected to different telecommunications networks, which method includes steps in which a service mediation server coordinates the processing operations performed by various telecommunications services on behalf of each of the users.

According to the invention, this method also includes steps in which:

the telecommunications services connect to the service mediation server and specify events of which they must be notified by the service mediation server, and/or events that they are capable of transmitting to the service mediation server, the telecommunications terminals of the users connect to the service mediation server, transmit, to the service mediation server, user profiles specifying availability modes, which are stored in a database, activate profiles and previously specified availability modes, and access the connected services, the service mediation server determines a state of connectability of each user on the basis of the existence of at least one user terminal connected to the server, and the user's active availability mode and profile, the service mediation server transmits to each connected terminal the state of connectability of users specified in a list of contacts forming part of the active profile of the terminal user, the service mediation server transmits, for each event received from a service, an event notification to the connected services having specified that they must be notified of the event.

According to a preferred embodiment of the invention, each availability mode specified by a user includes:

an availability state capable of having the values: available, not available, in call transfer to a specified call number, or unknown if the user does not want his/her availability state to be accessible, an optional terminal identifier to which an incoming call intended for the user is transferred, an event notification mode, and a list of contacts to which the availability state applies.

Advantageously, each availability mode specified by a user also includes availability rules specifying periods in which the availability mode is active.

Preferably, the connectability state determined by the service mediation server can be one of the following states:

connectable if the active availability mode of the user is in the available state and if at least one user terminal is connected to the service mediation server, not connectable if the user is not available or if no user terminal is connected to the service mediation server, access to the connectability state subject to authorisation if the user wants his/her connectability state to be provided to other users only with his/her prior authorisation, in transfer if the user specified that incoming calls intended for him/her must be transferred to a call number specified in the active availability mode, unknown if the requested user is not registered with the service mediation server, or if he/she does not want his/her connectability state to be accessible.

According to an embodiment of the invention, the transmission of event notifications by the service mediation server is carried out upon the request of each connected service.

According to another embodiment of the invention, the transmission of an event notification by the service mediation server is carried out upon receipt of the event if the service is connected; otherwise, the event is stored in a log and the service is notified of it when it connects to the service mediation server.

The invention also relates to a server for mediation of telecommunications services provided to a plurality of users, by means of telecommunications terminals connected to various telecommunications networks, including a service coordination module designed to coordinate the processing operations performed by the telecommunications services on behalf of each of the users.

According to the invention, this server also includes:

at least one database containing all of the data concerning the users, which is necessary for the service mediation server and the services, an availability server designed to manage and determine at any time the availability of the users, according to active availability modes and rules, specified by the users and stored in the database, a service management module designed to receive, from each service, an entry specifying events of which the services are to be notified and/or events transmitted by the service, and an event notification module designed to receive and notify the appearance of events to telecommunications services that have requested it, the service coordination module including means for determining a connectability state of each user for each of his/her profiles according to the existence of at least one user terminal connected to the server, and the user's active availability mode and profile, and means for transmitting, to each connected terminal, the connectability state of users specified in a list of contacts forming part of an active profile of the terminal user.

According to an embodiment of the invention, this server also includes an identification/authentication module intended to identify and authenticate the users when they access the service mediation server or certain services.

According to an embodiment of the invention, this server also includes an interface module providing access to the service mediation server by means of a telecommunications network, which module is designed to receive processing requests, from services or users, and to retransmit them to a component of the server responsible for carrying out the requested processing operation, and transmitting, in response to these requests, the responses provided by the components of the server.

Advantageously, the interface module comprises a plurality of duplicated components so as to ensure fault tolerance.

According to an embodiment of the invention, this server also includes an access monitor including:

means for connecting a user terminal to the mediation server and disconnecting it from the server, means for connecting a service to the mediation server and disconnecting it from the server, means for managing, in real time, the various services activated for the user, means for selecting a profile to be activated and an availability mode in the profile to be activated, means for selecting events of which the user wants to be notified of the appearance, and means for selecting a terminal to receive an incoming call.

The invention also relates to a computer program designed to be implemented on a server for mediation of telecommunications services provided to a plurality of users, by means of telecommunications terminals connected to various telecommunications networks. According to the invention, this program includes instructions for implementing the steps of the method defined above, executed by the service mediations server.

The invention also relates to a telecommunications server providing telecommunications services to a plurality of users, by means of telecommunications terminals connected to various telecommunications networks. According to the invention, the telecommunications server includes:

means for connecting to the service mediation server defined above, means for specifying and transmitting, to the service mediation server, events of which it must be notified by the service mediation server, and/or events that it is capable of transmitting to the service mediation server, and means for receiving, from the service mediation server, event notifications coming from other telecommunications services and having been specified as being required to be notified to it.

The invention also relates to a computer program designed to be implemented on a telecommunications server providing telecommunications services to a plurality of users, by means of telecommunications terminals connected to various telecommunications networks. According to the invention, this program includes instructions for implementing the steps of the method defined above, executed by a telecommunications service.

The invention also relates to an information system including a plurality of user telecommunications terminals connected to various telecommunications networks, a plurality of servers providing telecommunications services on behalf of the users, and a service mediation server as defined above.

BRIEF DESCRIPTION OF THE DRAWINGS

A preferred embodiment of the invention will be described below, by way of a non-limiting example, with reference to the appended drawings, wherein.

DETAILED DESCRIPTION OF THE INVENTION

Figure 1:
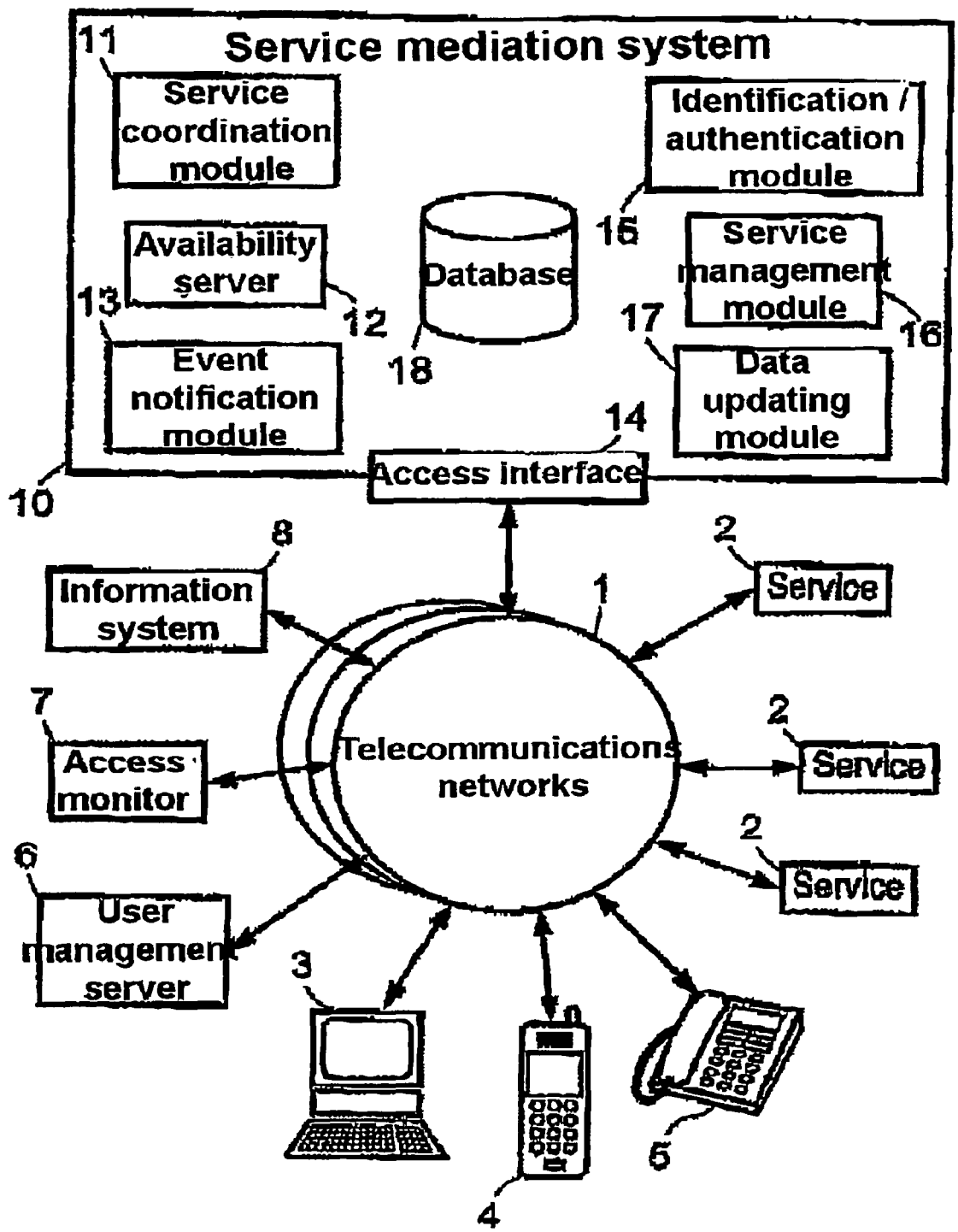
FIG. 1 diagrammatically shows a service mediation server according to the invention.

FIG. 1 shows a service mediation server 10 according to the invention, provided for connecting to telecommunications networks 1, such as terrestrial and cellular telephone networks, and computer networks such as the Internet.

This server is designed to provide the functions necessary for the management of a group of users, their profiles and services offered by telecommunications operators, wherein each of the users has access to the telecommunications networks 1 by means of one or more terminals of various types, such as a PC or PDA (Personal Digital Assistant) computer 3, or a cellular 4 or wire 5 telephone terminal. The services managed by the server are provided, for example, by servers 2 also connected to the telecommunications networks 1, or by user terminals.

The service mediation server 10 according to the invention includes the following components:

a service coordination module 11 designed to ensure coherency of the processing operations carried out by various services on behalf of a user, an availability server 12 designed to manage and determine, at any time, the availability of users, according to active availability modes and rules specified by the users, an event notification module 13 designed to receive and notify the appearance of events to services or users who have requested it, or to internal components of the service mediation server, an authentication/identification module 15 responsible for identifying and authenticating the users when they access certain functions of the server or certain services, a service management module 16 designed to receive registrations for services and to provide, upon request, the references of a registered service, one or more databases IS containing all of the data concerning the users, which is necessary for the service mediation server 10 and the services, a module 17 for updating data stored in the database 18, and an interface module 14 providing access to the mediation server 10 by means of a network 1, which module is designed to receive processing requests, from services or users, and to retransmit them to the component of the server responsible for carrying out the requested processing operation, and transmitting, in response to these requests, the responses provided by the components of the server.

To access the services offered by the service mediation server 10, each user must be previously registered and have an identifier or a contact number whereby he/she can be connected, independently of the connected terminal, at a given time to the server. The user must also define one or more profiles, which are stored in the database 18, and provide information on the terminals that he/she is capable of using and, in particular, the capabilities of these terminals and the available applications.

To modify the data stored in the database 18, a management server 6, for example, in the form of a Web or WAP (Wireless Application Protocol) server, is made available to the users. This management server enables each user to define and update one or more profiles each associated with a contact number whereby the user can be reached. Each user profile includes a list of services to which the user has subscribed, wherein each of the services on the list is optionally associated with parameters for personalisation of the service, and availability modes.

A user can thus define a plurality of profiles, for example a personal profile and a professional profile.

An availability mode corresponds to an activity of the user, for example, meeting, travel, etc. Each availability mode includes the following information:

an availability mode identifier, an availability state, namely, available, not available, in call transfer to a specified call number, or unknown if the user does not want his/her availability state to be accessible, an optional terminal or communication mode identifier (stationary telephone, mobile telephone, voice over IP, SMS (Short Message Service) written messages, MMS (Multimedia Messaging Service), electronic messaging), enabling an incoming call intended for the user to be transferred to the terminal thus identified, a notification mode (for example, in a messaging system), a list of contacts to which the availability state applies, and availability rules specifying periods in which the availability mode is to be active.

Alternatively, the availability rules can be defined in the profile independently of the availability modes, and specify the modes to be activated and deactivated according to the date and time, for example, in the form of a weekly, monthly or yearly calendar, A user profile also includes lists of contacts specifying the contacts authorised or not authorised to know the user's connectability state, and the contacts for which the user wants to obtain a connectability state. The connectability state of a user is determined according to the active availability state and the presence thereof, i.e. the existence of a user terminal accessible by the server, either directly or by means of a service (for example, a portal). Five connectability states are thus defined:

connectable: the user is connected and available, not connectable: the user is not connected or is not available, access to the connectability state subject to authorisation: the user wants his/her connectability state to be provided only with his/her prior authorisation, in transfer: the user has specified that incoming calls intended for him/her must be transferred to a certain call number specified in the availability mode, unknown: the requested user is not registered with the service mediation server 10, or does not want his/her connectability state to be known.

In addition, an access monitor 7, for example, designed in the form of a software component installed in each of the user terminals 3, 4, 5 or in the form of a Web or WAP server, offers users or services the following functions:

connect a terminal 3, 4, 5 to the mediation server 10 or disconnect it from the server, connect a service to the mediation server 10 or disconnect it from the server, manage, in real time, the various services activated for the user, choose a profile to be activated and a mode in the active profile or an availability level, subscribe to the notification of events to be selected, such as incoming call, lost call, change in availability state of a contact, receipt of a new message, updating of a use gauge, etc.

choose a terminal for receiving an incoming call, monitor the state of a use gauge, the use of his/her communication plan, and transmit and send urgent messages, wherein an urgent message is a voice or written message that can be sent by a user previously authorised by the called party, and routed to the latter regardless of his/her availability state.

If the access monitor 7 is in the form of a software component installed in each user terminal, it can be launched automatically when the terminal is turned on, in particular if the terminal is a mobile telephone.

The availability server 12 is designed to activate or deactivate availability modes according to orders received from users or according to availability rules associated with the profiles of said users. It also enables a user to obtain the availability state of a contact, if appropriate after having requested the authorisation of the concerned. The availability server is also designed to transform the availability rules specified by the users for the active modes into filtering rules directly interpretable by the service coordination module 11.

The event notification module 13 includes a registration/deregistration function enabling a service, a terminal by means of the access monitor, or a component of the service mediation server 10 to register or deregister as the transmitter of one or more events, and a subscription/unsubscription function enabling a service or a component of a service mediation server to register or deregister as the recipient of notifications of one or more events. An event can be related to a service (for example, "new service available") or to a user profile (for example "new voice message received").

When an event is no longer transmitted by any service, for example, after disconnection of the last event transmitting service, the module 13 informs the services subscribing to the event that the event is no longer available. Similarly, the module 13 also informs the services subscribing to an event that this event is again capable of being transmitted when a service transmitting this event is connected to the server 10.

This module also comprises a synchronisation function making it possible to associate an event notification with an asynchronous response of the entity having received the event notification, and a function for managing an event log that is updated each time an event occurs and the includes, for each event, the following information:

the date,
the content,
the transmitting service,
a list of profiles to which the event is to be sent, and services that subscribe to the event, wherein each service and profile is associated with an indicator indicating whether or not the service or the profile was notified of the event.

This module offers two operating modes. In a first so-called "push" mode, the services subscribing to an event are automatically notified by the module 13 when the event occurs. In a second so-called "pull" mode, a subscribing service obtains notifications of events that occurred by querying the module 13 via the interface module 14, either periodically or on request.

In "push" mode, the notification can be provided synchronously or asynchronously depending on whether the subscribing service is connected or not when the event occurs. After the notification of an event, the module 13 updates the event log.

The identification/authentication module 15 also makes it possible to find a user on the basis of a contact number. In addition, to authenticate a user, it can use external authentication servers.

The service management module 16 is designed to receive, from the services, registration requests each containing an identifier of the service, the actions it can provide, and optionally a class of service. This information is entered into a service directory, for example, integrated in the database 18. In addition, the module 16 is notified of the connection/disconnection of a service so as to update, in the service directory, an indicator for each service indicating whether or not the service is connected to the server 10.

The module 16 is also designed to receive service reference requests so as to make it possible to establish a direct call with it. Such a request contains the name of the service and that of the provider.

The module 17 for updating data is designed to receive information on the users, coming from external information systems 8 implemented by services in order to manage their respective subscribers. This module provides two main functions, namely a function of updating the database 18 and a function of transmitting "service tickets", enabling the users to be billed for the services used, to a system for collecting such tickets.

The updating of the database can be performed either in "pull" mode or in "push" mode.

In "pull" mode, the module 17 recovers, either on request or periodically, the information system 8 data, from remote servers such as FTP (File Transfer Protocol) servers. The recovered data is analysed, formatted and entered in the database 18.

Alternatively, the module 17 can transmit the recovered data to the other components of the server 10 that are concerned by this data, in which case the database is updated by these other components.

In the "push" mode, the information systems transmit their data to the access interface 14 of the server 10, either periodically or after inputting an update file, according to the operating mode of the information system. The access interface then retransmits the data received to the update module 17.

The database 18 can be a relational (SGBDR) or object (SGBDO) database, or an LDAP (Lightweight Directory Access Protocol) directory.

The interface 14 is advantageously designed to ensure a certain level of fault tolerance by distributing the requests received over a plurality of duplicated components. It is preferably produced using standard technologies such as CORBA (Common Object Request Broker Architecture), RMI (Remote Method Invocation) or SOAP (Simple Object Access Protocol).

The service coordination module 11 is designed to:

manage the connections between services and the mediation server 10, manage a user access session for each user profile activated on a terminal connected to the server, and a service session for each service activated by a user, determine the connectability of each user, according to the existence of at least one access session for the user (corresponding to a profile activated by the user), manage, in real time, the assessment of the use of services by the various users.

Figure 2:
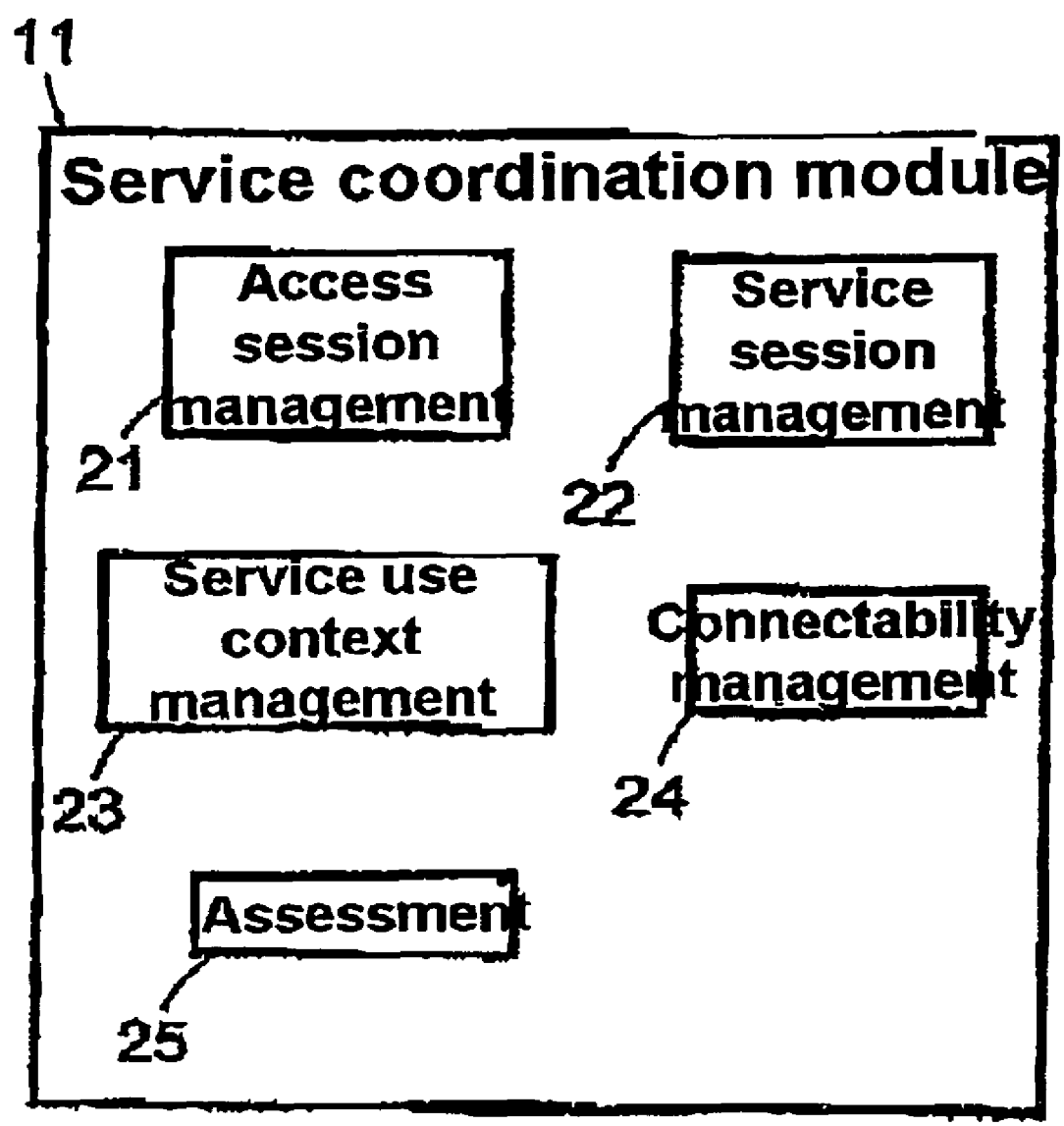
FIG. 2 shows in greater detail a service coordination module implemented by the server shown in FIG. 1.

To this end, as shown in FIG. 2, the module 11 includes:

an access session management function 21, for creating/deleting/modifying an access session, respectively, upon each activation/deactivation of a user profile, a service session management function 22, for creating/deleting/modifying, at the user's request, a service session for each service mentioned in each active profile, a function 23 for managing the context of service use so as to coordinate the operations performed by a plurality of services for a user, a connectability management function 24 for determining the connectability of each user on the basis of the existence of at least one active access session for this user, the active availability mode and the profile of the user, and a function 25 for assessing the access and/or use of a service by a user.

When a user terminal 3, 4, 5 is connected to the server 10, the service coordination module 11 asks the access session management function 21 to create an access session for each profile to be activated. When the user selects a service, the function 22 also creates a service session for the service selected.

The creation of a service session means that the user was previously identified and authenticated by means of the identification and authentication module 15.

The function for managing the connectability of each user consists of determining, for an incoming call intended for a user or following a request transmitted by a service, whether the call is to be accepted, rejected, notified or forwarded to a forwarding number or a messaging system, according to the user's connectability state, and, optionally, filtering rules provided by the availability server, and the identity of the contact making the call. This function therefore calls upon the access session management function 21 in order to determine whether the user is connected to the server, as well as on the availability server 12 in order to obtain the user's availability mode and the filtering rules.

With these provisions, a user can indicate that he/she is available for certain contacts, and not available for other contacts. He/she can also define the communication means to be used to receive incoming calls and to receive event notifications (voice, written messaging). He/she can authorise certain contacts to obtain his/her connectability state, and know the communication modes (voice, written, immediate, delayed) that they can use to reach him/her.

Thus, the access monitor 7 is advantageously designed to display the list of contacts of the user, wherein each contact is associated with an indicator indicating the contact's connectability state. It can also enable the user to initiate a call to one of the contacts on the list after making a selection from it and from a communication type (voice, written, delayed, immediate) available for this contact.

This selection action initiates the transmission, by the server 10, of an "incoming call" event notification to one of the accessible terminals of the contact called for the profile considered, wherein the access monitor informs the called user of the receipt of such a notification. The signalling mode used depends on the terminal. In the case of a PC or PDA computer, this signalling can be provided in the form of a "pop up". On a mobile telephone, it can be provided by a "Simtoolkit" application.

After receipt of such a notification, the called user can choose the terminal with which it wants to take the call. When the call has been established between two users, the assessment module initiates a count of the call duration. If, during a call between two users, another user attempts to establish a call with one of them, the called user receives an incoming call event notification on the accessible terminal(s) of the called user for the profile considered. At the end of a call between two users, the assessment module transmits a service ticket and updates a use gauge on the terminals by sending a message in relation thereto to the terminals connected on the called profile (on which the incoming call was made), which message contains information on a communication plan (maximum amount, amount used).

When a terminal is disconnected, the service coordination module 11 ends the access sessions relating to the profiles activated on this terminal. The service sessions associated with these access sessions are also ended.

The services must be registered with the server 10 beforehand and be connected thereto in order to provide the services to the users. Upon connection to the server, a service indicates to the server the events of which it is to be notified. When a user accesses a registered and connected service, the service initiates a user identification and authentication procedure and asks the server for information on the user in order to verify that he/she has the authorisations necessary for accessing the service. At the beginning and end of the provision of a service, the service calls on the server to record the use of the service by the user, for the purpose of assessment. When no user accesses a service, the service can be disconnected from the server.

The service mediation server according to the invention is advantageously in the form of a reusable component, called a "white brick", Bo as to be heavy-duty and fault tolerant, and capable of being integrated inexpensively in any server providing services, With these provisions, the service mediation server according to the invention enables users to access their personalised services from any telecommunications terminal and any access to a telecommunications network, while simplifying the access to these services. It also enables users to manage their availability with regard to other users, independently of the telecommunications network.

The invention claimed is:

1. A telecommunications mediation system comprising:
at least one telecommunications network;
a plurality of telecommunications terminals connected to the telecommunications network;
at least one telecommunications service server providing at least one telecommunications service and communicating to the system a registration request, the registration request including:
the at least one telecommunications service the telecommunications service server is capable of providing, and
a list of events for which the at least one telecommunications service is to be notified;
at least one user profile, the user profile being user-defined via the at least one of the plurality of telecommunications terminals and comprising:
a record of data including a list of telecommunications services to which the user has subscribed from among a plurality of available telecommunications services,
at least one availability mode corresponding to an activity of the user, said availability mode including:
an availability mode identifier,
an availability state defining whether the user is available, unavailable, in call, or unknown, and
availability rules defining when the availability mode is active,
a list of services to which the user has subscribed, and
a record of a capability of the at least one of the plurality of telecommunications terminals, said record of capability including information to enable communications with a plurality of different types of terminals with different hardware and software capabilities; and
a service mediation server comprising:
at least one non-transitory computer-readable storage medium configured to store at least one user profile, and
a processing unit receiving the at least one user profile and storing the received at least one user profile in the storage medium, and coordinating telecommunications services based on information stored in the storage medium, said coordinating performed by performing tasks including:
determining user availability by evaluating the at least one user profile,
coordinating the notification and operation of events between users and services by:
receiving notifications from the telecommunications service server,
evaluating the user profile based on user availability, and
communicating to the user by communicating interactions to the at least one of the plurality of telecommunications terminals in a terminal-appropriate format based on the capability of the at least one of the plurality of telecommunications terminals included in the at least one user profile, and
coordinating the notification and operation of events to the at least one telecommunications service of the at least one telecommunications service server by communicating to the service according to the registration request.

2. The system of claim 1, the processing unit being further capable of communicating a user connectability state associated with a user to the at least one of the plurality of telecommunications terminals by evaluating the at least one user profile stored in the storage medium and a contact list of an active user profile of a terminal user.

3. The system of claim 2, wherein the user profile further comprises a list of contacts authorized to know the connectability state associated with the user and a list of contacts not authorized to know the connectability state associated with the user.

4. The system of claim 1, the processing unit being further capable of identifying and authenticating users that attempt to access the service mediation server or the at least one telecommunications service server.

5. The system of claim 1, the processing unit further comprising an interface adapted to provide access to the service mediation server via the telecommunications network by:
receiving processing requests from the at least one telecommunications service server or users;
retransmitting the processing requests to a component of the service mediation server responsible for performing a requested processing operation; and
transmitting a response from the component of the service mediation server in response to the processing requests.

6. The system of claim 5, wherein the interface comprises a plurality of duplicated components to provide fault tolerance.

7. The system of claim 1, the processing unit being further capable of access tasks including:
connecting and disconnecting a telecommunications terminal and the service mediation server;
connecting and disconnecting a telecommunications service and the service mediation server;
managing, in real time, telecommunications services activated for the user;
selecting a user profile and an availability mode in the user profile to be activated;
selecting events for user notification; and
selecting a telecommunications terminal to receive an incoming call.

8. The system of claim 1, wherein each of the plurality of telecommunications terminals is selected from the group consisting of: a personal computer, a personal digital assistant (PDA), a cellular telephone, and a wire telephone.

9. The system of claim 1, wherein the at least one telecommunications network is selected from the group consisting of: a terrestrial telephone network, a cellular telephone network, and a computer network.

10. The system of claim 1, wherein the at least one telecommunications service server comprises:
a processing unit capable of at least:
connecting to the telecommunications mediation system,
specifying and transmitting the telecommunications service registration request to the telecommunications mediation system, the registration request comprising at least one event of which the telecommunications service server must be notified by the telecommunications mediation system or that the telecommunications service server is capable of transmitting to the telecommunications mediation system, and
receiving, from the telecommunications mediation system, event notifications from other telecommunications services having been specified as required to be notified by the telecommunications service server registration request.

11. The system of claim 1, wherein the non-transitory computer-readable storage medium is further configured to store the telecommunications service registration request.

12. A method for coordinating telecommunications services provided to a plurality of users via a plurality of telecommunications terminals connected to at least one telecommunications network, the method comprising:
connecting the telecommunications services to a service mediation server, the service mediation server having a processing unit and at least one non-transitory computer-readable storage medium;
connecting at least one of the plurality of telecommunications terminals of a user to the service mediation server;
determining, by the service mediation server, user availability by evaluating at least one user profile, the user profile being user-defined via the at least one of the plurality of telecommunications terminals, stored in the storage medium, and comprising:
a record of data including a list of telecommunications services to which the user has subscribed from among a plurality of available telecommunications services,
at least one availability mode corresponding to an activity of the user, said availability mode including:
an availability mode identifier,
an availability state defining whether the user is available, unavailable, in call, or unknown, and
availability rules defining when the availability mode is active
a list of services to which the user has subscribed, and
a record of a capability of the at least one of the plurality of telecommunications terminals, said record of capability including information to enable communications with a plurality of different types of terminals with different hardware and software capabilities;
coordinating, by the service mediation server, the notification and operation of events between users and services by:
receiving, from a telecommunications server, a registration request, the registration request including the at least one telecommunications service the telecommunications service server provides and a list of events for which the at least one telecommunications service is to be notified of by the service mediation server,
receiving notifications from the telecommunications service server,
evaluating the user profile based on the determined user availability, and
communicating to the user by communicating interactions to the at least one of the plurality of telecommunications terminals in a terminal-appropriate format based on the capability of the at least one of the plurality of telecommunications terminals included in the at least one user profile;
coordinating the notification and operation of events to the at least one telecommunications service of the at least one telecommunications service server by communicating to the at least one telecommunications service according to the registration request; and
communicating a user connectability state associated with a user to the at least one of the plurality of telecommunications terminals by evaluating the user profile stored in the storage medium and a contact list of an active user profile of a terminal user.

13. The method according to claim 12, wherein each availability mode defined by a user includes:
an availability state capable of having the values of available and not available, in call transfer to a specified call number or an unknown number if the user does not want his/her availability state to be accessible, an optional terminal identifier to which an incoming call intended for the user is transferred, an event notification mode, and a list of contacts to which the availability state applies.

14. The method according to claim 13, wherein each availability mode defined by a user also includes availability rules specifying periods in which the availability mode is active.

15. The method according to claim 12, wherein the connectability state of each user can be in one of the following states:

connectable if the active availability mode of the user is in the available state and if at least one user terminal is connected to the service mediation server, not connectable if no user terminal is connected to the service mediation server, access to the connectability state subject to authorization if the user wants his/her connectability state to be provided to other users only with his/her prior authorization, in transfer if the user specified that incoming calls intended for him/her must be transferred to a call number specified in the active availability mode, and unknown if the requested user is not registered with the service mediation server or if he/she does not want his/her connectability state to be accessible.

16. The method according to claim 12, wherein the transmission of event notifications to services is carried out upon the request of each connected service.

17. The method according to claim 12, wherein the transmission of an event notification to a service is performed upon receipt of the event if the service is connected; otherwise, the event is stored in a log and is notified to the service when the latter connects to the service mediation server.

18. The method of claim 12, wherein a plurality of user profiles are defined via the at least one of the plurality of telecommunications terminals.

19. The method of claim 18, wherein the plurality of user profiles include a personal profile and a professional profile.

20. The method of claim 12, wherein a plurality of availability modes corresponding to activities of the user are defined in the user profile.

21. The method of claim 20, wherein the plurality of availability modes include a meeting mode and a travel mode.

* * * * *